United States Patent [19]

Bobrowski et al.

[11] Patent Number: 5,427,617

[45] Date of Patent: * Jun. 27, 1995

[54] METHODS AND COMPOSITIONS FOR RECLAIMING CONCRETE

[75] Inventors: Gregory S. Bobrowski, Chagrin Falls; Gregory C. J. Guecia, Painesville; David A. Lupyan, Chagrin Falls; Frederick D. Kinney, Broadview Heights, all of Ohio

[73] Assignee: Sandoz Ltd., Basel, Switzerland

[ * ] Notice: The portion of the term of this patent subsequent to Oct. 23, 2007 has been disclaimed.

[21] Appl. No.: 110,463

[22] Filed: Aug. 23, 1993

Related U.S. Application Data

[60] Continuation of Ser. No. 6,017, Jan. 15, 1993, abandoned, which is a continuation of Ser. No. 936,694, Aug. 27, 1992, abandoned, which is a continuation of Ser. No. 790,949, Nov. 12, 1991, abandoned, which is a continuation of Ser. No. 572,512, Aug. 24, 1990, abandoned, which is a division of Ser. No. 494,876, Mar. 8, 1990, Pat. No. 4,964,917, which is a continuation of Ser. No. 88,180, Aug. 21, 1987, abandoned, which is a continuation-in-part of Ser. No. 900,489, Aug. 26, 1986, abandoned.

[51] Int. Cl.⁶ ...................... C04B 24/00; C04B 24/06
[52] U.S. Cl. ..................... 106/802; 106/724; 106/725; 106/727; 106/728; 106/729; 106/804; 106/806; 106/808; 106/809; 106/810; 106/819; 106/823
[58] Field of Search ............... 106/724, 727, 781, 804, 106/806, 808, 819, 823, 802, 809, 725, 728, 729, 810

[56] References Cited

U.S. PATENT DOCUMENTS 3,346,487 10/1967 Irani et al. ..................... 252/8.5
(List continued on next page.)

FOREIGN PATENT DOCUMENTS 886330 5/1981 Belgium .
166798 1/1986 European Pat. Off. .
2057918 5/1971 France .
2474479 7/1981 France .
2513623 8/1981 France .
2937835 2/1981 Germany .
54-141819 11/1979 Japan .
0076328 4/1981 Japan .
0156950 9/1984 Japan .
1325543 8/1970 United Kingdom .
132543 8/1973 United Kingdom .
1538102 1/1979 United Kingdom .
1538103 1/1979 United Kingdom .
2132599 6/1986 United Kingdom .
2168695 6/1988 United Kingdom .
726307 4/1980 U.S.S.R. .
985257 1/1983 U.S.S.R. .
1051229 10/1983 U.S.S.R. .

OTHER PUBLICATIONS

Chemical Abstract, vol. 102, No. 10, abstract No. 83476h (1985) (no month).
Chemical Abstract, vol. 105, No. 2, abstract No. 11015w (1986) (no month).
Chemical Abstract, vol. 94, No. 22, abstract No. 179611v no date.
Bentonwerk & Fertigteil-Technik, Heft Aug. 1972, pp. 571-580.
Bentonwerk & Fertigteil-Technik, Heft Sep. 1983, pp. 321-324.
"Practical Quality Control For Concrete", Joseph J. Waddell, pp. 139-141 (no date).

Primary Examiner—Anthony Green
Attorney, Agent, or Firm—Robert S. Honor; Richard E. Vila; Carol A. Loeschorn

[57] ABSTRACT

A method of reclaiming leftover ready-mix concrete comprising the steps of:

(1) retarding the hydration of the unused portion of concrete returned from a job site; and (2) after the desired retarded period adding a hydration acceleration agent to restore the concrete to a settable state.

13 Claims, No Drawings

U.S. PATENT DOCUMENTS

| | | | |
|---|---|---|---|
| 3,346,488 | 10/1967 | Lyons et al. | 252/8.5 |
| 3,619,221 | 11/1971 | Kossivas | 106/727 |
| 3,624,018 | 11/1971 | Eilers et al. | 524/377 |
| 3,689,295 | 9/1972 | Hersey et al. | 106/727 |
| 3,794,506 | 2/1974 | Schmidt et al. | 106/90 |
| 3,839,260 | 10/1974 | Eilers et al. | 523/130 |
| 3,839,262 | 10/1974 | Eilers et al. | 524/234 |
| 3,839,263 | 10/1974 | Eilers et al. | 523/130 |
| 3,885,985 | 5/1975 | Serafin et al. | 106/820 |
| 3,941,772 | 3/1976 | Ploger et al. | 106/781 |
| 3,973,978 | 8/1976 | Nakagawa et al. | 106/694 |
| 4,190,454 | 2/1980 | Yamagisi et al. | 106/708 |
| 4,210,455 | 7/1980 | Metcalf et al. | 106/727 |
| 4,264,368 | 4/1981 | Schutz | 106/728 |
| 4,286,992 | 9/1981 | Galer et al. | 106/696 |
| 4,337,094 | 6/1982 | Tukar | 106/727 |
| 4,401,473 | 8/1983 | Kleiner et al. | 106/781 |
| 4,455,171 | 6/1984 | Spensley | 106/694 |
| 4,461,644 | 7/1984 | Childs et al. | 106/725 |
| 4,466,835 | 8/1984 | Crump et al. | 106/717 |
| 4,466,836 | 8/1984 | Crump et al. | 106/717 |
| 4,468,252 | 8/1984 | Crump et al. | 106/717 |
| 4,472,200 | 9/1984 | Crump et al. | 106/717 |
| 4,473,405 | 9/1984 | Gerber | 106/727 |
| 4,494,990 | 1/1985 | Harris | 106/732 |
| 4,500,356 | 2/1985 | Crump et al. | 106/727 |
| 4,582,139 | 4/1986 | Childs et al. | 106/727 |
| 4,606,770 | 8/1986 | Gerber | 106/727 |
| 4,655,838 | 4/1987 | Yasuharu | 524/5 |
| 4,661,161 | 4/1987 | Jakacki et al. | 106/648 |
| 4,676,832 | 6/1987 | Childs et al. | 106/727 |
| 4,680,396 | 7/1987 | Crump et al. | 544/337 |
| 4,683,003 | 7/1987 | Nakano et al. | 106/677 |
| 4,700,780 | 10/1987 | Brothers | 166/293 |
| 4,964,917 | 10/1990 | Bobrowski et al. | 106/804 |

METHODS AND COMPOSITIONS FOR RECLAIMING CONCRETE

This is a continuation of application Ser. No. 08/006,017 filed on Jan. 15, 1993, now abandoned, which in turn is a continuation of application Ser. No. 07/936,694 filed on Aug. 27, 1992, now abandoned, which in turn is a continuation of application Ser. No. 07/790,949 filed on Nov. 12, 1991, now abandoned, which in turn is a continuation of application Ser. No. 07/572,512 filed on Aug. 24, 1990, now abandoned, which in turn is a division of application Ser. No. 07/494,876 filed on Mar. 8, 1990, now U.S. Pat. No. 4,964,917, which in turn is a continuation of application Ser. No. 07/088,180 filed on Aug. 21, 1987, now abandoned, which in turn is a continuation of application Ser. No. 06/900,489 filed on Aug. 26, 1986, and now abandoned.

BACKGROUND OF THE INVENTION

This invention relates to concrete reclamation. In one particular aspect it relates to methods and compositions for reclaiming concrete which is normally discarded.

It is presently the practice in the concrete industry that when a ready-mix truck returns from a job with an unused portion of concrete, this excess concrete is dumped into a disposal site. This practice is both economically and environmentally undesirable.

The present invention provides methods and admixture compositions to reclaim this wasted concrete.

THE INVENTION

Broadly, the concrete reclaiming method of this invention comprises the steps of:

1—retarding the hydration of the unused portion of concrete returned from a job site by adding within 0.5 to 7 hours, preferably 1 to 4 hours a retarding agent which is a chelating agent for calcium, e.g., [nitrilotris (methylene)]tris, phosphonic acid to the concrete, to retard hydration for normally an additional 12 to 90 hours, preferably 12 to 72 hours;

2—optionally, at the end of the desired retardation period, diluting the retarded concrete with fresh concrete; and 3—adding hydration accelerating agents (e.g., ASTM C494 Type C admixture) to the concrete to restore it to a settable state. Optionally, water reducing strength enhancers (e.g., ASTM C494 Type A admixture) may be added with the accelerating agents.

It will be appreciated by those skilled in the art that the following factors will influence (a) the retardation time and retarder concentration, and (b) the acceleration time and accelerator and water reducing strength enhancer concentration.

—The ASTM type of cement. While Types I–IV are applicable to the present process, Types I and II are preferred. The amount of accelerator to be added to the cement (step 3 above) may be dependent on the degree of fly ash substitution in the cement. In general, more accelerator is necessary with fly ash substitution.

—Time of addition of the retarding agent to cement. Usually concrete is placed within 1.5 hours of mixing, and the retarding agent would be added at the end of the placing period. However, the actual time of adding the retarding agent may be prolonged if the concrete maintains the required slump, air content, and unit weight. It is preferred that the retarding agent be added to the cement within about 1 to 4 hours after initial mixing.

—Time of set. The set rate of concrete may be affected by the temperature, e.g., the higher the temperature, the faster the set rate; and also by the concentration of the retarder and accelerator and their ratio to each other. In addition the amount of the water reducing strength enhancer may also have an effect on the concentration of retarder to accelerator. Additionally the set rate is also dependent on the volume of concrete to be treated. The volume of concrete effects the temperature of the concrete. A larger volume of concrete will set up sooner than a smaller volume because of the greater amount of heat liberated. A preferred temperature range is from 32° F. to 110° F., preferably 32° F. to 99° F. At a temperature of from 32° F. to 69° F. a preferred time of addition of the retarding agent is from about 1 to 4 hours. At a temperature of from 70° F. to 99° F. a preferred time of addition of the retarding agent is from about 1 to 3 hours.

—Percent of old (reclaimed) concrete to fresh concrete in the final mix. The old concrete may range from about 5% to 100% with the fresh concrete from 95% to 0%. Preferably the old concrete may be from about 10% to 30%, and the fresh concrete from about 90% to 70% of the concrete mixture. Clearly, the higher the proportion of reclaimed concrete, the more accelerator must be added.

—The amounts of added retarding agent and accelerating agent may vary depending upon the types and amounts of the admixtures in the original cement and the freshly added cement.

DESCRIPTION OF PREFERRED EMBODIMENTS

The retarders used in the process of the invention must, when used in appropriate quantities, be long-acting and reversible in action, so that addition of an accelerator can restore the concrete to essentially its original state.

The preferred retarders are phosphonic acid derivatives, more preferably those containing hydroxy and amino groups, which are capable of acting as calcium chelating agents. Particularly preferred retarders of this type are compounds of DEQUEST (R.T.M.) series, sold by Monsanto Co. (St. Louis, Mo.), in particular: DEQUEST 2000 Phosphonic acid, [nitrilotris (methylene)]tris. DEQUEST 2006 Phosphonic acid, [nitrilotris (methylene)]tris-, pentosodium salt., DEQUEST 2010 Phosphonic acid, (1, hydroxyethylidene) bis. DEQUEST 2016 Phosphonic acid, (1,hydroxyethylidene) bis-, tetrasodium salt. DEQUEST 2041 Phosphonic acid, [1,2-ethanediylbis [nitrilobis (methylene)]]tetrakis. DEQUEST 2047 Phosphonic acid, [1,2-ethanediylbis [nitrilobis (methylene)]]tetrakis-, calcium sodium salt (2:5:6). DEQUEST 2051 Phosphonic acid, [1,6-hexanediylbis [nitrilobis (methylene)]]tetrakis. DEQUEST 2054 Phosphonic acid, [1,6-hexanediylbis [nitrilobis (methylene)]]tetrakis-, potassium salt. DEQUEST 2060 Phosphinic acid, [[bis[2-bis (phosphonomethyl) amino]ethyl]amino]methyl]. DEQUEST 2066 Phosphonic acid, [[(phosphonomethyl) imino] bis [(2,1-ethanediylnitrilo) tetrakis (methylene)]] tetrakis-, sodium salt.

Other suitable retarders include hydroxycarboxylic acids and their salts, including citric, gluconic, tartaric, and glucoheptanoic acids; polycarboxylic acids and their salts, e.g., polymaleic, polyfumaric, polyacrylic and polymethacrylic acids, preferably of low molecular weight; fumaric, itaconic and malonic acids and their salts; antioxidants e.g., ascorbic acid, isoascorbic acid; polymers e.g., sulphonic acid—acrylic acid copolymers, polyhydroxysilanes and polyacrylamide, preferably of low molecular weight; carbohydrates, e.g., sucrose and corn syrup; and lignosulphonates, e.g., calcium lignosulphonates. Of these, the hydroxycarboxylic acids, polycarboxylic acids, ascorbic acid, isoascorbic acid, carbohydrates and polyhydroxysilanes are preferred.

More preferred retarders are mixtures of at least one retarder of the phosphonic acid type with at least one retarder of a different type. As many of the non-phosphonic acid retarders e.g., citric acid also have water-reducing properties, these may also have the effect of increasing the compressive strength of the final set concrete.

Particularly preferred retarders are mixtures of the DEQUEST series with citric acid, particularly DEQUEST 2000/citric acid. Preferred ratios of DEQUEST to citric acid are from 1:1 to 2:1.

A preferred retarding formulation (R) of this invention is:
 0.318% of phosphonic acid, [nitrilotris (methylene)]-tris-DEQUEST 2000
 0.2000% of citric acid The percentages are lb per 1000 lbs. of cement at 100% active material, which may be added for example as 40 oz. of solution to 100 lbs. of cement.

Preferred accelerating agents which may be used in this invention to reactivate the retarded concrete are those classified in ASTM C 494 Type C admixtures. Preferred accelerator compositions are chloride-free and may contain for example calcium salts e.g., calcium nitrate and calcium formate, thiocyanates, triethanolamine and glycolurils e.g., trimethylolglycoluril. A particularly preferred accelerator of this type is that sold by Master Builders Inc. (Cleveland, Ohio) under the trademark POZZOLITH 555 A.

Preferred water-reducing strength enhancers which may optionally be added together with the accelerating agent are those classified in ASTM C 494 as Type A admixtures; that is they are water reducing agents which of themselves have no substantial retarding or accelerating effect. A particularly preferred material is that sold by Master Builders Inc. under the trademark POZZOLITH POLYHEED.

It is also possible, instead of using a combination of Type C admixture as accelerator and a Type A admixture as water-reducing agent, to use a single addition of a Type E admixture, which is water-reducing accelerator. The combination of a Type C and a Type A product is however preferred.

In the following examples, formulation A is the commerical water reducing strength enhancing admixture, POZZOLITH POLYHEED- Master Builders Cleveland, Ohio, a low-retardation lignosulphonate-based water reducer, supplied as an aqueous solution containing 39% active material.

Formulation C is the commerical accelerating admixture, POZZOLITH 555A-Master Builders, a calcium nitrate-based chloride free accelerator supplied as an aqueous solution containing 48.7% active material.

The cement used was Kaiser Cement Type I/II with a 15% substitution of Jim Bridger fly ash (CF517 @70° F.)*. *CF=cement factor (Total cementive content) in pounds per cubic yard at 70° F.

The amounts of concrete used in the experiments was based upon the following cubic yard formulation:
 438.7 lbs cement
 78.7 lbs fly ash
 1455.7 lbs sand
 1698.7 lbs stone
 295 lbs water The tests were carried out in 5 gallon containers (approximately 2 cu. ft.). The amount of materials added to the concrete is based upon 100 lbs of cement, e.g., 80 oz=80 oz/100 lbs of cement.

The procedure for the experiments was as follows:

On the first day, the concrete mixtures were prepared with or without an admixture. Each concrete mixture was then put into the 5 gallon container for approximately 2 hours. After 2 hours, the retarder formulation was added to each container, and the contents mixed.

On the second day, the contents of the container were mixed with fresh concrete at a ratio of one part of the retarded concrete to five parts of fresh concrete (1:5). The accelerator formulation was then added and the concrete mixture was tested for % air, ROH and compressive strengths. All experiments were compared with a plain concrete reference.

Example I

A number of concentrations of, DEQUEST 2000 were evaluated either alone or with citric acid. The concrete mix was reactivated with 5 oz/100 lbs of cement of composition A and 50 oz/100 lbs of cement of composition C. The results are shown in Table I.

TABLE I

| Retarder Formula | | Dose | ROH* | Compressive Strength lbs/in² 14 D** | 28 D |
|---|---|---|---|---|---|
| #1) | DEQUEST 2000 .3182 #/100# cement | 80 oz. | — | 4124 | 5532 |
| #2) | DEQUEST 2000 .2273 #/100# cement | 80 oz. | — | 3935 | 5256 |
| #3) | DEQUEST 2000 .3182 #/100# cement citric acid .2000 #/100# cement | 80 oz. | — | 4560 | 6132 |
| #4) | Plain cement reference | — | 5.5 hrs. | 3769 | 4619 |

*ROH = Rate of Hardening (initial set)
**D = Day, e.g., 14 D = 14 Days

Example II

Various DEQUEST retarder materials were evaluated with citric acid, Each DEQUEST material was tested at 0.3182 lbs/100 lbs of cement. The amount of citric acid (100% active material) remained constant at 0.2000 lbs/100 lbs of cement. The DEQUEST material and citric acid were added to the concrete as a 40 oz/100 lbs of cement aqueous solution.

The cement mix was reactivated with 5 oz./100 lbs. of cement of composition A and 50 oz./100 lbs. of cement of composition C. The results are shown in Table II.

TABLE II

| Retarder Formula | % Air | ROH | Compressive Strength lb/in² 1 D | 7 D |
|---|---|---|---|---|
| Plain Cement | .7 | 5.500 hrs | 1229 | 3638 |

TABLE II-continued

| Retarder Formula | | % Air | ROH | Compressive Strength lb/in² 1 D | 7 D |
|---|---|---|---|---|---|
| Reference | | | | | |
| 1) DEQUEST 2000 | .3182 | 2.0 | 4.000 hrs | 2181 | 6300 |
| Citric acid | .2000 | | | | |
| 2) DEQUEST 2006 | .3182 | 1.8 | 4.250 hrs | 2097 | 5938 |
| Citric acid | .2000 | | | | |
| 3) DEQUEST 2010 | .3182 | 1.9 | 3.875 hrs | 1992 | 5716 |
| Citric acid | .2000 | | | | |
| 4) DEQUEST 2016 | .3182 | 1.8 | 4.000 hrs | 2047 | 5953 |
| Citric acid | .2000 | | | | |
| 5) DEQUEST 2041 | .3182 | 1.8 | 5.000 hrs | 1725 | 6016 |
| Citric acid | .2000 | | | | |
| 6) DEQUEST 2051 | .3182 | 2.0 | 3.500 hrs | 1960 | 5904 |
| Citric acid | .2000 | | | | |
| 7) DEQUEST 2054 | .3182 | 1.9 | 3.250 hrs | 2047 | 5910 |
| Citric acid | .2000 | | | | |
| 8) DEQUEST 2060 | .3182 | 1.8 | 3.875 hrs | 1912 | 5878 |
| Citric acid | .2000 | | | | |
| 9) DEQUEST 2066 | .3182 | 2.2 | 3.750 hrs | 2210 | — |

Example III

In a preferred method of operating the process of the invention, when a ready-mix truck returns to a mixing plant with an unused portion of concrete, the temperature of the load is measured with a probe, the volume, of the load is estimated, and on the basis of these data and of the known characteristics of the concrete batch, the quantity of retarder necessary to keep the load usable until the next working day is calculated. Advantageously, this may be done by a suitably programmed microcomputer, and the required amount of retarder (preferably as an aqueous solution) may be automatically metered into the load.

The load is mixed for a short time, then left to stand without further mixing until the next working day. The required amount of fresh concrete is then mixed into the reclaimed concrete, the temperature is again measured, and the required amount of accelerator (and, if required, of water reducing agent) is calculated. Again, addition may be carried out under automatic computer control. In the following Table III are various retarding compositions in fluid ounces (fl. oz.) of solution per 100 lbs of cementitious material, of formulation (R) of this invention. The compositions are based on;

(1) Time from the initial batching of the concrete,
(2) The temperature of the concrete at the time of addition, and
(3) The length of time of retardation of set of the concrete desired, e.g., overnight (about 18–24 hours), or over a weekend (about 48–72 hours).

TABLE III

| Concrete °F. | Overnight dosage for up to 1.5 cu. yd. | for more than 1.5 cu. yd. | Weekend dosage |
|---|---|---|---|
| 90–99 | 55 fl. oz. | 70 fl. oz. | 145 fl. oz. |
| 80–89 | 50 fl. oz. | 65 fl. oz. | 135 fl. oz. |
| 70–79 | 40 fl. oz. | 55 fl. oz. | 125 fl. oz. |
| 60–69 | 35 fl. oz. | 45 fl. oz. | 115 fl. oz. |
| 50–59 | 25 fl. oz. | 25 fl. oz. | 105 fl. oz. |
| 40–49 | 20 fl. oz. | 20 fl. oz. | 95 fl. oz. |
| 32–39 | 15 fl. oz. | 10 fl. oz. | 85 fl. oz. |

The retarded concrete, after mixing with 5 parts of fresh concrete to 1 part of old retarded concrete, can be reactivated with the amount of accelerator formulation C (in fluid ounces of solution per 100 lbs. cementitious material) as shown in Table IV

TABLE IV

| Concrete °F. | Overnight retardation accelerator dosage | Weekend retardation accelerator dosage |
|---|---|---|
| 80–89 | 30 fl. oz. | 85 fl. oz. |
| 70–79 | 40 fl. oz. | 105 fl. oz. |
| 60–69 | 50 fl. oz. | 115 fl. oz. |
| 50–59 | 60 fl. oz. | 120 fl. oz. |
| 40–49 | 70 fl. oz. | 125 fl. oz. |
| 32–39 | 80 fl. oz. | 130 fl. oz. |

What is claimed is:

1. A method for reclaiming concrete which comprises the steps of:
   1. retarding the hydration of the concrete by adding a retarding amount of a retarding agent selected from the group consisting of hydroxycarboxylic acids and their salts; polycarboxylic acids and their salts; fumaric, itaconic and malonic acids and their salts; ascorbic acid; isoascorbic acid; sulphonic acid-acrylic acid copolymers; polyhydroxysilanes; polyacrylamide; carbohydrates and lignosulphonates to the concrete in a container; and
   2. at the end of the desired retardation period, adding a hydration acceleration agent to the retarded concrete in the container to restore it to a settable state.

2. A method for reclaiming concrete which comprises the steps of:
   1. retarding the hydration of the concrete by adding a retarding amount of a retarding agent selected from the group consisting of hydroxycarboxylic acids and their salts; polycarboxylic acids and their salts; fumaric, itaconic and malonic acids and their salts; ascorbic acid; isoascorbic acid; sulphonic acid-acrylic acid copolymers; polyhydroxysilanes; polyacrylamide; carbohydrates and lignosulphonates to the concrete in a ready-mix container; and
   2. at the end of the desired retardation period, adding a hydration acceleration agent to the retarded concrete in the ready-mix container to restore it to a settable state.

3. The method according to claim 1 wherein the retarded concrete is diluted with fresh concrete before adding the accelerating agent.

4. The method according to claim 2 wherein the retarded concrete is diluted with fresh concrete before adding the accelerating agent.

5. The method according to claims 1, 2, 3 or 4 wherein a water reducing strength enhancer is added with the accelerating agent.

6. The method according to claims 1, 2, 3 or 4 wherein a time of addition of the retarding agent is from about 1 to 4 hours after the initial mixing of the concrete.

7. The method according to claim 3 for 4 wherein the percent of retarded concrete to fresh concrete is from about 5% to 100% retarded concrete to about 95% to 0% fresh concrete.

8. The method according to claims 1, 2, 3 or 4 wherein the retarder comprises at least one compound selected from the group consisting of hydroxycarboxylic acids, polycarboxylic acids, ascorbic acid, isoascorbic acid, corn syrup, polyhydroxysilanes, and lignosulphonates.

9. The method according to claim 1 or 2 wherein the accelerating agent comprises at least one compound selected from the group consisting of calcium salts, thiocyanates, triethanolamine and glycolurils.

10. The method according to claim 9 wherein the accelerating agent consists of a mixture of calcium nitrate, sodium thiocyanate, triethanolamine and trimethylolglycoluril.

11. The method according to claim 5 wherein the water reducing strength enhancer is a lignosulphonate derivative.

12. The method according to claims 1, 2, 3 or 4 wherein the retarding agent is selected from the group consisting of citric acid, gluconic acid, tartaric acid, fumaric acid, itaconic acid, malonic acid, glucoheptonic acids and salts thereof; polymaleic acid, polyfumaric acids, polyacrylic acids, polymethacrylic acids and salts thereof; sucrose, corn syrup and calcium lignosulphonates.

13. The method according to claim 12 wherein the retarding agent is gluconic acid or a salt thereof.

* * * * *